United States Patent [19]
Petersen

[11] 3,984,239
[45] Oct. 5, 1976

[54] FILLER METAL
[75] Inventor: Walter Adrian Petersen, Ridgewood, N.J.
[73] Assignee: The International Nickel Company, Inc., New York, N.Y.
[22] Filed: Apr. 7, 1975
[21] Appl. No.: 565,603

[52] U.S. Cl.................................. 75/171; 75/122; 75/134 F; 148/32
[51] Int. Cl.².................................... C22C 19/05
[58] Field of Search.............. 75/171, 170, 134 F, 75/122; 148/32, 32.5

[56]         References Cited
        UNITED STATES PATENTS
3,690,873   9/1972   Fontaine ............................. 75/171
3,817,747   6/1974   Schultz et al. ....................... 75/171

Primary Examiner—R. Dean
Attorney, Agent, or Firm—Ewan C. MacQueen; Raymond J. Kenny

[57] ABSTRACT

An alloy particularly suited for use as an inert gas shielded-arc filler metal containing 28% to 35% chromium, 13% to 18% iron, 2.8% to 4.2% aluminum, 0.1% to 3.8% manganese, up to 0.2% silicon, 0.3% to 0.8% titanium, 0.04% to 0.15% carbon and the balance essentially nickel. The filler provides the capability for making substantially defect-free welds in heavy section thicknesses that have excellent elevated temperature carburization resistance and strength.

10 Claims, No Drawings

FILLER METAL

The present invention relates to nickel-base welding materials, more particularly, to nickel-chromium-iron filler metal for inert gas shielded-arc welding.

A nickel-base alloy, described in U.S. Pat. No. 3,817,747, is particularly suited for use in elevated temperature applications involving severe carburization conditions such as those found in a furnace designed for ethylene production. Such an alloy contains about 0.05% to about 0.15% carbon, from about 28% to about 35% chromium, from about 10% to about 22% iron, from about 2.5% to about 6% aluminum, up to about 2% silicon, from about 0.05% to about 0.8% titanium and the balance essentially nickel and is hereinafter referred to as the base alloy.

It is essential that such a base alloy, in addition to having excellent elevated temperature strength, carburization resistance and oxidation resistance, possess a high degree of weldability. While weldability tests show that the base alloy possesses a capability for being welded to a certain degree, nonetheless susceptibility to weld deposit cracking was found in ½-inch thick welds made with matching composition filler metal, i.e., filler metal made from the base alloy.

In the envisioned applications for the base alloy, extremely good weldability is desired and there is a need for entirely crack-free welds in heavily restrained sections that also possess excellent elevated temperature strength, carburization resistance and oxidation resistance. Although crack-free welds can be made in the base alloy with a number of commercial filler metals, the weld deposits formed will not afford the desired elevated temperature strength, carburization resistance and oxidation resistance.

It has now been discovered that entirely sound crack-free welded joints can be produced in the base alloy, including heavily restrained sections, by the use of a special filler metal composition. Such highly restrained welds possess elevated temperature strength, carburization resistance and oxidation resistance equivalent to that afforded by the base alloy. The filler metal is also useful for the preparation of sound, heavily restrained welds in dissimilar materials, such as stainless steels and other nickel-base alloys and may further be used to join the base alloy to these dissimilar metals.

It is an object of this invention to provide a filler metal suitable for inert gas shielded-arc welding of various alloys, particularly those corresponding to the base alloy above described, e.g., a 31% chromium, 17% iron, 3% aluminum, nickel-base alloy.

It is another object of this invention to provide a filler metal with exceptional elevated temperature strength, carburization resistance and oxidation resistance.

It is a further object of this invention to provide an inert gas shielded-arc filler metal that is capable of joining the base alloy to dissimilar metals.

Generally speaking, the present invention is directed to an alloy particularly suitable for inert gas shielded-arc welding, the alloy consisting essentially of (by weight) from about 28% to about 35% chromium, from about 13% to about 18% iron, from about 2.8% to about 4.2% aluminum, from about 0.1% to about 3.8% manganese, up to about 0.2% silicon, from about 0.3% to about 0.8% titanium, from about 0.04% to about 0.15% carbon, and the balance essentially nickel.

In order to obtain the preferred combination of weldability and elevated temperature properties, the filler metal should contain from about 31% to about 34% chromium, from about 15% to about 17% iron, from about 3.0% to about 4.0% aluminum, from about 0.2% to about 1.0% manganese, up to about 0.1% silicon, from about 0.3% to about 0.8% titanium, from about 0.06% to about 0.10% carbon, up to about 0.03% oxygen, up to about 0.02% nitrogen and the balance essentially nickel.

Weld deposits made with the filler metal of this invention are characterized by a two phase, coarse grained microstructure in the as-welded condition. The weld deposit has an austenitic (face-centered cubic) matrix with a uniformly dispersed chromium-rich alpha-prime (body-centered cubic) second phase at the grain boundaries and within the grains. Although various post-weld heat-treatments are considered within the scope of this invention, such an as-deposited structure does not require a post-weld heat-treatment to attain adequate resistance to carburization and suitable elevated temperature strength.

In carrying the invention into practice it is preferred to employ chromium contents in excess of 28%, and preferably, in excess of 31%, to obtain the required stress-rupture life and carburization resistance. Chromium levels substantially above 35%, or even 34%, can lead to the formation of excessive quantities of the alpha-prime phase which can lead to deterioration of the hot and cold workability of the filler metal.

Iron contents above about 22% can be responsible for weld cracking while quantities below about 10% will unnecessarily increase the cost of the filler alloy. In seeking high resistance to carburization, it is advantageous for the filler metal to contain a minimum of about 13%, or even about 15%, of iron and the maximum amount should be about 18%, and preferably about 17%. Within the aforedescribed narrower range of composition, the highest stress rupture values are obtained in 2000°F tests.

The minimum amount of aluminum in the filler is dictated primarily by the carburization resistance desired. It is advantageous to provide high aluminum levels in alloys containing low levels of chromium and conversely, heats low in aluminum should have higher chromium contents to attain the desired level of carburization resistance. Generally, a minimum level of 2.8% or even 3% aluminum is chosen for maximum resistance to carburization. Since increasing quantities of aluminum improve carburization resistance, it is advantageous to have large amounts of aluminum present in the filler metal, however, an upper limit of 4.2%, and preferably not more than 4%, should be contained in this alloy so that it may be successfully hot and cold worked.

Manganese is essential in a filler metal suited for joining the base alloy under conditions imposing severe restraint. The presence of manganese in an amount as small as 0.2%, or even 0.1%, in an alloy containing less than about 0.2% silicon will provide welded joints of heavy section thickness entirely free from weld deposit cracking. An upper limit for manganese of 3.8% was determined because excessive amounts of manganese, e.g., 5%, can lead to hot working difficulties during the initial breakdown of the cast ingot. Furthermore, welds made with filler wires containing such high manganese levels have lower stress rupture lives than desirable. In order to obtain stress rupture properties equivalent to those of the base alloy, it is preferred to limit the manganese content of the filler metal to 1%.

Silicon may be contained in the base alloy up to about 2%, and preferably up to about 1%. It is considered to enhance carburization, oxidation and sulfidation resistance; however, this element adversely affects the weldability of the base alloy. By limiting the presence of this element, it is possible, in the presence of manganese, to provide a filler metal possessing excellent weldability. The silicon content of the filler metal should be less than about 0.2%, or even less than about 0.1%, to avoid weld deposit cracking. No adverse effect on creep rupture strength, or carburization resistance, or oxidation resistance stems from the lower silicon content of weld deposits made with such filler metals.

A standard addition of 0.5% titanium was used for the preparation of prospective heats of filler. Deviation from the practice of adding 0.5% titanium results in severe edge cracking of billets during hot working. A minimum titanium content of about 0.3% and a maximum of about 0.8% are needed for satisfactory hot working characteristics.

The alloy should contain a minimum of 0.04% carbon, preferably 0.06%, so that adequate stress rupture life is attained in the weld deposits. An upper limit for carbon is considered to be about 0.15%, preferably 0.10%, since alloys containing carbon in excess of this amount may be susceptible to cracking during hot and cold working. Also, in an alloy containing high carbon, i.e., 0.25%, severe weld centerline cracking has been found.

In carrying the invention into practice, it is preferred to employ vacuum or other suitable melting techniques that provide very low oxygen and nitrogen contents in the filler, e.g., less than about 0.03% oxygen and less than about 0.02% nitrogen. Simple weldability tests on heats of the base alloy containing significant nitrogen additions (0.08%) have shown severe heat-affected zone cracking during bend testing. Such performance is indicative of susceptibility to cracking in non-vacuum melted heats. For this reason, the approach should be to maintain the oxygen and nitrogen levels below about 0.06% each.

The balance of the alloy consists of nickel in quantities generally ranging from about 38% to about 56%. This element is responsible, in combination with the other elements contained within the alloy, for imparting the austenitic (face-centered cubic) structure to the matrix as well as other advantageous physical and metallurgical properties.

As will be understood by those skilled in the art, the term "balance" or "balance essentially" used herein in referring to the nickel content does not exclude the presence of other elements such as those commonly present as incidental elements, e.g., deoxidizing and cleansing elements, and impurities normally associated therewith, in small amounts which do not adversely affect the basic characteristics of the alloys. In this connection, the impurities include boron and zirconium which normally should not exceed 0.01% each and sulfur and phosphorus, which should not usually be allowed to exceed 0.02% each. Examples of incidental elements are cobalt, columbium, copper and molybdenum which can be present in small amounts, e.g., preferably not above about 0.5% each, in the subject alloys. However, the total amount of elements other than chromium, nickel, iron, aluminum, manganese, and titanium should not exceed about 2.5%.

For the purpose of giving those skilled in the art a better understanding of the invention, the following examples are given.

Heats of filler metal were prepared by vacuum induction melting 48 kilogram charges. Nickel and iron were placed in a magnesia-lined crucible and heated to melting. Chromium, a small amount of manganese and silicon were then added and the molten charge held under vacuum for 30 minutes at temperatures ranging from about 2850°F to 2900°F. Carbon was added in the form of high-carbon chromium. The furnace chamber was backfilled with argon to a pressure of ½ atmosphere and a second manganese addition was made, when required, followed by aluminum and titanium. The heats were poured at 2750°F to 2800°F into 5-inch square cast-iron ingot molds.

After cooling, ingots were stripped from their molds and cleaned by removing a ⅛-inch layer of metal from four surfaces. They were soaked at 2200°F for four hours, hot-rolled to 3-inch square billet and cut in half. Following an additional soaking treatment at 2200°F for about one hour, the billets were hot-rolled to ⅝-inch square bar and 1⅛ inch thick by 4-inch wide plate.

The ⅝-inch bars were annealed at 2200°F for one hour followed by water quenching. They were then cold-rolled and swaged or drawn to 0.14-inch diameter wire using three intermediate anneals at 2200°F. Subsequently, they were straightened and centerless ground to ⅛-inch diameter for use as welding wire.

The 1⅛ inch thick plate was annealed for one hour at 2300°F to provide increased rupture life associated with a coarsened grain. The plate was surfaced on two sides and its thickness reduced to 1 inch. One edge of the plate was given a single U-groove preparation which consisted of a 15° bevel blended to a 3/32-inch root face with a ¼-inch radius. Plates prepared in this manner and having the same composition as the filler wire undergoing test were used for the welding tests described herein.

The weldability of prospective filler compositions shown in Table I was assessed with 1-inch thick joints using the manual gas tungsten-arc welding process. The welding conditions were: 24 volts, 220 amperes and a manual travel speed of about 2½ inches per minute. Argon shielding gas was used for these welds and the non-consumable tungsten electrode was ⅛-inch diameter. The 1-inch thick by 3-inch wide by 4-inch long joints were restrained by clamping to a 3-inch thick cast iron platen. These conditions imposed severe restraint upon the base plate and consequently upon the weld deposit.

TABLE I

| Alloy No. | Compositions of Filler Metals, Weight Percent | | | | | | | | | |
|---|---|---|---|---|---|---|---|---|---|---|
| | C | Mn | Si | Ni | Cr | Al | Ti | Fe | O | N |
| 1 | .094 | .22 | .01 | Bal. | 31.6 | 3.80 | .47 | 17.1 | .0110 | .0059 |
| 2 | .092 | .44 | .01 | Bal. | 32.1 | 3.77 | .45 | 16.3 | .0140 | .0070 |
| 3 | .094 | .76 | .01 | Bal. | 32.2 | 3.92 | .48 | 16.4 | .0150 | .0056 |

TABLE I-continued

| Alloy No. | Compositions of Filler Metals, Weight Percent | | | | | | | | | |
|---|---|---|---|---|---|---|---|---|---|---|
| | C | Mn | Si | Ni | Cr | Al | Ti | Fe | O | N |
| 4 | .090 | 2.0 | <.005 | Bal. | 31.5 | 3.85 | .54 | 18.0 | .0036 | .0057 |
| 5 | .091 | 3.8 | <.005 | Bal. | 31.1 | 3.60 | .38 | 18.1 | .0020 | .0050 |
| 6 | .068 | .30 | .08 | Bal. | 29.7 | 3.60 | .54 | 18.3 | .0034 | .0067 |
| A | .090 | <.01 | .49 | Bal. | 32.0 | 3.50 | .50 | 19.0 | (.01) | (.005) |
| B | .080 | .24 | .43 | Bal. | 34.5 | 2.90 | .40 | 18.5 | .0031 | .0039 |
| C | .091 | .43 | .22 | Bal. | 31.1 | 3.85 | .51 | 18.5 | .030 | .0068 |
| D | (.08) | (5.0) | (0.1) | Bal. | (32) | (3.6) | (.5) | (18) | (.01) | (.005) |

( ) indicates nominal composition.

Completed welds were radiographically inspected, cut into ½ and ⅜-inch wide transverse slices, ground, polished on a rubber bonded abrasive wheel, etched with Lepito's reagent and examined microscopically for cracking at 10 magnifications. As a further test of weld quality, ⅜-inch thick slices from each weld were bent 180° about a 1½ inch diameter pin and reexamined at 10 magnifications.

Weld Nos. 1 through 6 in Table II, were prepared with alloys Nos. 1 through 6. All of these joints, made with filler metals having compositions within the composition range of the alloy of this invention, were free from defects upon radiographic examination. Microscopic examination at 10 magnifications of transverse slices and 180° bend test specimens also showed freedom from weld and heat-affected zone cracking. These results demonstrate the excellent weldability of the filler metal of this invention.

TABLE II

Weldability and Bend Test Results

| Alloy No. | Weld No. | Average No. of Cracks/Section | | | |
|---|---|---|---|---|---|
| | | Transverse Slices | | Bend Test | |
| | | Weld | HAZ | Weld | HAZ |
| 1 | 1 | 0 | 0 | 0 | 0 |
| 2 | 2 | 0 | 0 | 0 | 0 |
| 3 | 3 | 0 | 0 | 0 | 0 |
| 4 | 4 | 0 | 0 | 0 | 0 |
| 5 | 5 | 0 | 0 | 0 | 0 |
| 6 | 6 | 0 | 0 | 0 | 0 |
| 4 | 7 (1) | 0 | 0 | (1) | — |
| 4 | 8 (2) | 0 | 0 | 0 | 0 |
| A | 9 | 1.9 | 0 | 4.5 | 0 |
| B | 10 | 3.6 | 0 | 7.0 | 0 |
| C | 11 | 0.3 | 0 | 3.0 | 0 |
| D | | Broke up during hot rolling | | | |

(1) Dissimilar Weld to HK-40. Bend specimen broke in HK-40
(2) Dissimilar weld to alloy 800.

Dissimilar welds, Nos. 7 and 8 in Table II were prepared using filler alloy No. 4, a piece of base plate from this heat and the cast stainless steel HK-40 (1) or wrought INCOLOY alloy 800 (2). The two alloys chosen for these dissimilar welds are representative of alloys currently used in ethylene furnaces. Both welds were radiographically sound. Microscopic examination of polished and etched transverse slices showed freedom from weld and heat-affected zone cracking. In bend tests, the dissimilar joint to INCOLOY alloy 800 was entirely free from weld and heat-affected zone cracking. The second joint broke during bend testing in the HK-40 casting in an area removed from the weld deposit and heat-affected zone. These joints demonstrate the capability for preparation of dissimilar joints with the filler metal of this invention.

Alloy A shown in Table I is representative of the base alloy composition. When a 1-inch thick weld, No. 9 in Table II was attempted with a matching composition filler wire, an unacceptable level of cracking of 1.9 cracks per section was found in transverse weld sections and an average of 4.5 cracks per section was found in the 180° bend test. These results show the need for a special filler metal for welding the base alloy under conditions imposing severe restraint.

Alloy B in Table I represents an alloy containing a small manganese addition (0.24%) and the normal level of silicon (0.34%) for the base alloy. Although radiographic examination of this weld did not show cracking in the weld deposit, 1. HK-40 is an Alloy Casting Institute Designation for an alloy containing nominally: 26% Cr, 20% Ni, 2% Mn, 2% Si, 0.4% C, bal. Fe.
2. INCOLOY is a trademark of The International Nickel Co., Inc. Alloy 800 contains nominally: 32% Ni, 21% Cr, bal. Fe.

examination of transverse slices revealed an average of 3.6 cracks per section, an unacceptable level of cracking. Bend tests of ⅜-inch thick slices were also unacceptable, exhibiting an average of 7.0 cracks per section. A weld in Alloy C (No. 11 in Table II) containing sufficient manganese (0.34%) and only slightly excessive silicon (0.22%), contained 0.3 cracks per section in transverse slices and 3.0 cracks per section in the bend test. The latter results were somewhat better than those found in weld No. 10, suggesting the beneficial influence of higher manganese and lower silicon contents; however, this behavior was not equivalent to that described previously for welds made with fillers having compositions within the range of this invention.

Alloy D in Table I, nominally containing 5% manganese and 0.1% silicon, was outside of the composition range of the filler metal of this invention. The ingot broke up during hot rolling and demonstrates the need to limit the manganese content of the filler metal of this invention in order to provide adequate hot workability.

Stress-rupture tests were conducted at 2000°F on weld Nos. 1 through 6 at stresses of 2500, 2000 and 1500 psi as shown in Table III. Test coupons were prepared from the transverse weld slices and contained base alloy, heat-affected zone and weld deposit. The stress-rupture life of welds made with alloys conforming to the composition of this invention was equal to that of the base alloy. Fracture generally occurred outside of the weld deposit.

TABLE III

Stress Rupture Properties of Welds

| | 2500 psi | 2000 psi | 1500 psi |
|---|---|---|---|

TABLE III-continued

| Alloy No. | Weld No. | Test Temp.,°F | Stress Rupture Properties of Welds | | | | | | | | |
|---|---|---|---|---|---|---|---|---|---|---|---|
| | | | Life, Hours | Elong. % | Fracture Location | Life, Hours | Elong. % | Fracture Location | Life, Hours | Elong. % | Fracture Location |
| 1 | 1 | 2000 | 35.1 | 3.0 | plate | 82.5 | 6.0 | HAZ | 182.7 | 12.0 | HAZ |
| 2 | 2 | 2000 | 34.0 | 3.0 | plate | 58.7 | 5.0 | plate | 114.9 | 11.0 | plate, HAZ |
| 3 | 3 | 2000 | 37.2 | 7.0 | weld | 56.5 | 5.2 | plate | 205.2 | 9.0 | HAZ |
| 4 | 4 | 2000 | 25.1 | 5.0 | weld | 65.9 | 6.0 | plate | 144.3 | 5.0 | weld |
| 5 | 5 | 2000 | 8.6 | 11.0 | plate | 38.8 | 20.0 | plate | 88.3 | 12.0 | plate |
| 6 | 6 | 2000 | 17.7 | 3.0 | weld | 80.2 | 4.0 | weld | 156.5 | 4.0 | weld |
| | | | 8000 psi | | | 6000 psi | | | 3000 psi | | |
| 4 | 7[1] | 1800 | 4.7 | 7.0 | HK-40 | 20.6 | 12.0 | HK-40 | 273.8 | 8.0 | Base alloy |
| 4 | 8[2] | 1800 | 1.6 | 17.0 | alloy 800 | 5.7 | 21.0 | alloy 800 | 75.0 | 28.0 | alloy 800 |

[1]Dissimilar weld to HK-40
[2]Dissimilar weld to INCOLOY alloy 800

The stress-rupture lives of weld Nos. 1, 2 and 3 made with alloy Nos. 1, 2 and 3 and representing alloys within the preferred range for the filler metal were somewhat greater than those exhibited by weld Nos. 4 to 6, prepared with alloys Nos. 4 to 6. Weld Nos. 4 and 5 contained 2.0% and 3.8% manganese, outside the preferred range for manganese, and as a consequence the stress-rupture life was somewhat lower than desired, although certainly adequate for many applications. This shows the need to limit the manganese content of the filler metal in order to obtain stress-rupture life equivalent to that of the base alloy.

Weld No. 6 in Table II contained 29.7% chromium and was within the composition range of the filler metal of this invention; however, it was outside of the preferred range for chromium. Stress-rupture test results contained in Table III show that this alloy has somewhat low stress-rupture life attributable to the lower chromium content of the alloy. Even though the stress-rupture life of this weld was somewhat lower than desired, the alloy would still be suitable for many applications.

Because the stress-rupture lives of HK-40 and INCOLOY alloy 800 are considerably lower than those of the base alloy at 2000°F, stress-rupture tests were performed at 1800°F on the dissimilar welds, Nos. 7 and 8. The results of these tests show that the stress-rupture life of the weld deposit and base alloy exceeds that of HK-40 and INCOLOY alloy 800, since fracture generally occurs in the dissimilar base alloys. This further demonstrates the compatibility of the filler alloy of this invention with dissimilar alloys.

Carburization resistance was examined at 1100°C by passing a mixture of hydrogen and 2% methane through a furnace containing weld samples at a flow rate of 1000 cc. per minute for 100 hours. The test pieces were 0.762 cm. diameter by 1.90 cm. long pins containing a transverse section of a weld and including heat-affected zone on both sides of the weld deposit. Following exposure, the pins were descaled by blasting with 50 micron alumina abrasive propelled by dry $CO_2$ in an S.S. White precision abrasive cleaning unit. The descaled weight. of pins from weld Nos. 1 to 3 together with the descaled weight of other representative alloys are contained in Table IV. Also, the maximum depth of penetration of carbon was determined with a Leitz measuring microscope at 100 magnifications on transverse cross sections cut from the center of these pins. This information together with the descaled weight loss shows that welds made with the alloys of this invention have extremely good resistance to carburization and equivalent to that of the base alloy.

TABLE IV

| Alloy No. | Weld No. | Carburization in $H_2$ - 2% $CH_4$ at 1100°C for 100 hrs. | | Oxidation in Air + 5% $H_2O$ 1100°C 24 hr. cycles. 504 hrs. | |
|---|---|---|---|---|---|
| | | ΔW Descaled, mg/cm² | Max. Attack cm. | ΔW Undescaled, mg/cm² | ΔW Descaled, mg/cm² |
| 1 | 1 | −1.04 | 0.058 | −42.19 | −53.15 |
| 2 | 2 | −0.87 | 0.077 | −42.84 | −52.75 |
| 3 | 3 | −1.34 | 0.058 | −45.64 | −56.47 |
| HK-40 | | 27.41 | 0.762 | −106.77 | −121.10 |
| alloy 800 | | 33.83 | 0.762 | −189.03 | −197.32 |
| HASTELLOY alloy X[1] | | | | −44.60 | −54.69 |

[1]Hastelloy is a trademark of Cabot Corp.

The cyclical oxidation resistance of the alloys of this invention was determined at 1100°C in a mixture of air plus 5% water vapor flowing at 250 cc. per minute for a total of 504 hours. Every 24 hours, the specimens were removed from the test chamber and cooled to room temperature. As shown in Table IV, the oxidation resistance of the weld deposits was superior to that of cast HK-40 and wrought INCOLOY alloy 800 and equivalent to that of an oxidation resistance commercial alloy HASTELLOY alloy X.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. A weld filler metal for inert gas shielded-arc welding consisting essentially of (by weight): from about 28% to about 35% chromium, from about 10% to about 22% iron, from about 2.8% to about 4.2% aluminum, from about 0.1% to about 3.8% manganese, up to about 0.2% silicon, from about 0.3% to about 0.8% titanium, from about 0.04% to about 0.15% carbon, and the balance essentially nickel.

2. A weld filler metal as defined in claim 1 containing: from about 31% to about 34% chromium, from about 15% to about 17% iron, from about 3% to about 4% aluminum, from about 0.1% to about 3.8% manganese, up to about 0.2% silicon, from about 0.3% to about 0.8% titanium, from about 0.06% to about 0.10% carbon, up to about 0.03% oxygen, up to about 0.02% nitrogen, and the balance essentially nickel.

3. A weld filler metal as defined in claim 2, wherein the manganese is in an amount from about 0.2% to about 1%.

4. A weld filler metal as defined in claim 2, wherein the silicon is in an amount up to about 0.1%.

5. As a new article of manufacture, a wrought filler metal having a composition as set forth in claim 1.

6. As a new article of manufacture, a wrought filler metal having a composition as set forth in claim 2.

7. As a new article of manufacture, a wrought filler metal having a composition as set forth in claim 3.

8. As a new article of manufacture, a wrought filler metal having a composition as set forth in claim 4.

9. A welded structure with a cast weld deposit consisting essentially of (by weight): from about 28% to about 35% chromium, from about 10% to about 22% iron, from about 2.8% to about 4.2% aluminum, from about 0.1% to about 3.8% manganese, up to about 0.2% silicon, from about 0.3% to about 0.8% titanium, from about 0.04% to about 0.15% carbon, and the balance essentially nickel.

10. A weld deposit with a cast microstructure having an austenitic matrix with a uniformly dispersed alpha-prime second phase at the grain boundaries and within the grains consisting essentially of (by weight): from about 28% to about 35% chromium, from about 10% to about 22% iron, from about 2.8% to about 4.2% aluminum, from about 0.1% to about 3.8% manganese, up to about 0.2% silicon, from about 0.3% to about 0.8% titanium, from about 0.04% to about 0.15% carbon, and the balance essentially nickel.

* * * * *